United States Patent [19]

Kriewaldt

[11] Patent Number: 5,492,144
[45] Date of Patent: Feb. 20, 1996

[54] MULTI-COMPARTMENTED VACUUM TANK

[76] Inventor: George Kriewaldt, 110 Pierce St., Iola, Wis. 54945

[21] Appl. No.: 267,376

[22] Filed: Jun. 29, 1994

[51] Int. Cl.⁶ .................................................. F16N 31/00
[52] U.S. Cl. .......................... 137/205; 137/208; 137/209; 184/1.5
[58] Field of Search .................................... 137/205, 208, 137/209; 141/59; 184/1.5

[56] References Cited

U.S. PATENT DOCUMENTS

| | | | |
|---|---|---|---|
| 1,587,864 | 6/1926 | Sargent | 137/205 |
| 1,829,173 | 10/1931 | Wertz . | |
| 1,955,169 | 4/1934 | Bertschinger . | |
| 2,006,393 | 7/1935 | Hapgood | 141/59 X |
| 2,160,741 | 5/1939 | Jensen et al. . | |
| 2,192,727 | 3/1940 | Courtis et al. | 137/205 X |
| 2,479,139 | 8/1949 | Seigel . | |
| 2,664,911 | 1/1954 | Thompson et al. | 137/205 |
| 2,820,528 | 1/1958 | Harper . | |
| 3,621,893 | 11/1971 | Nishimura | 137/205 X |
| 3,780,757 | 12/1973 | Jordan | 137/205 |
| 3,867,999 | 2/1975 | Cox | 184/1.5 |
| 3,971,400 | 7/1976 | Thompson | 137/205 |
| 4,057,364 | 11/1977 | Bratschitsch | 137/205 X |
| 4,082,124 | 4/1978 | Jenkins | 137/205 X |
| 4,363,222 | 12/1982 | Cain | 137/205 X |
| 5,062,500 | 11/1991 | Miller et al. . | |

Primary Examiner—Gerald A. Michalsky
Attorney, Agent, or Firm—Jacobson, Price, Holman & Stern

[57] ABSTRACT

A storage vessel, such as a compartmented vacuum tank or a plurality of vacuum tanks, is connected to a vacuum pump. The vacuum pump is used to produce a vacuum in each compartment of a multi-compartmented vacuum tank or in each tank of a plurality of vacuum tanks such that a suction nozzle extending from each compartment of a compartmented vacuum tank or from each of a plurality of vacuum tanks can remove various operating liquids from fill ports of a salvage vehicle. The liquids are segregated according to type of liquid and fill a compartment of a multi-compartmented vacuum tank or a tank of a plurality of vacuum tanks to a level at which the vacuum to the compartment or tank is terminated by a float valve. During evacuation of the tank compartments or vacuum tanks, fumes drawn off through the vacuum line from the fluids in the compartments or tanks are fed through the vacuum pump to a discharge line and forced towards a vent to the atmosphere. Prior to atmospheric venting, a portion of the collected fumes are drawn off by a bleed line and delivered to an air intake manifold of a gasoline engine which powers the vacuum pump. Accordingly, a portion of the evacuated fumes are burnt within the power source, such as a gasoline engine, used to drive the vacuum pump.

12 Claims, 2 Drawing Sheets

MULTI-COMPARTMENTED VACUUM TANK

FIELD OF THE INVENTION

This invention relates to a movable multi-compartmented vacuum tank charged by a vacuum pump driven by an external power source so as to remove operating fluids from salvage vehicles while burning some of the fumes emanating from the fluids stored in the vacuum tank by directing a portion of the fumes into the air intake of the external power source.

BACKGROUND OF THE INVENTION

Salvage yards have traditionally been a source of waste fluids which must be disposed of in some manner. Traditionally, a salvage vehicle was hoisted onto a rack to elevate the vehicle. Drain plugs are then removed from the vehicle so that the operating fluids of the vehicle flow by gravity out of the salvage vehicle to splash into a funnel leading to a disposal barrel. Fumes from the operating fluids readily escape into the atmosphere.

Recently, the Environmental Protection Agency has increased pressure on salvage yards to capture all operating fluids of salvage vehicles, such as transmission fluid, engine oil, coolant, brake fluid and power steering fluid, prior to disassembly, crushing or transport of the vehicle. It is now important that these fluids be completely captured and steps taken to prevent these fluids from splashing or in any other manner be released onto the ground.

In addition to the systems used for septic tank cleaning, some known systems for fluid removal are described in the following patents:

U.S. Pat. No. 2,820,528 to Harper discloses an apparatus for cleaning gear cases and refining the oil contained therein. The device withdraws and cleans any lubricant or oil in a gear case or lubricant chamber, and while the withdrawn oil is being cleaned, directs heated wash oil into the gear case to clean the interior thereof and the gears contained therein.

U.S. Pat. No. 1,829,173 to Wertz discloses a combination flushing device and lubricant dispenser whereby the transmission or differential of an automobile may be cleaned and flushed and which may be operated to deliver clean lubricant into the mechanism after the cleaning and flushing operation has been completed.

U.S. Pat. No. 1,955,169 to Bertschinger discloses an apparatus for cleaning crank cases which is easy to operate and which insures quick service. A readily movable self-contained unit is provided which can be brought to the automobile. The device includes a tank part comprising a receptacle or reservoir for flushing oil and a receptacle to receive waste oil.

U.S. Pat. No. 2,160,741 to Jensen et al. discloses distributor systems including piping through which predetermined flow is governed by operation of a single control device and a distributor control for multi-compartment tank vehicles such as are ordinarily used in the transportation of liquid products like fuel oils, lubricating oils and gasoline.

U.S. Pat. No. 2,749,130 to Seigel discloses a portable lubricating unit for servicing aircraft and other lubricant-using equipment that is not readily maneuverable to a lubricating station, but must have the lubricating service brought to it. The device provides a mobile unit equipped to remove the used oil and to supply clean oil without contamination by the used oil.

U.S. Pat. No. 5,062,500 to Miller et al. discloses a cart for draining, filtering and recycling oil or similar viscous fluids from vehicles. This cart can simultaneously collect, filter and reintroduce oil or similar fluids back into machinery.

However, the problem remains to ensure removal of all potentially environmentally-damaging fluids from a salvage vehicle with a minimum of spillage. It would also be advantageous to withdraw these fluids from a salvage vehicle without having to first elevate the salvage vehicle so as to rely on gravity to remove the operating fluids from the salvage vehicle.

SUMMARY OF THE INVENTION

Accordingly, it is an object of the present invention to remove all potentially environmentally-harmful operating fluids from a salvage vehicle by transporting a multi-compartmented vacuum tank to the vehicle by a truck, trailer or pickup truck, for example, and to evacuate the operating fluids from the salvage vehicle by a vacuum system.

This object is accomplished by the present invention by the use of a storage vessel such as a compartmented vacuum tank or a plurality of vacuum tanks to which is connected a vacuum pump. The vacuum pump is used to produce a vacuum in each compartment of a multi-compartmented vacuum tank or in each tank of a plurality of vacuum tanks such that a suction nozzle extending from each compartment of a compartmented vacuum tank or from each of a plurality of vacuum tanks can remove various operating liquids from fill ports of a salvage vehicle. The liquids are segregated according to type of liquid and fill a compartment of a multi-compartmented vacuum tank or a tank of a plurality of vacuum tanks to a level at which the vacuum to the compartment or tank is terminated by a float valve.

During evacuation of the tank compartments or vacuum tanks, fumes drawn off through the vacuum line from the fluids in the compartments or tanks are fed through the vacuum pump to a discharge line and forced towards a vent to the atmosphere. Prior to atmospheric venting, a portion of the collected fumes are drawn off by a bleed line and delivered to an air intake manifold of a gasoline engine which powers the vacuum pump. Accordingly, a portion of the evacuated fumes are burnt within the power source, such as a gasoline engine, used to drive the vacuum pump.

By the use of the vacuum pump it is also possible to close a valve to shut-off a vacuum line and by another valve open a discharge line from the vacuum pump to pressurize the tank compartments or vacuum tanks. If the tank compartments need to be emptied, a valve at the bottom of the tank would release pressurized fluid. The fluid may thereby be forced to a higher elevation, for example, for transfer to a disposal or recycling system.

It is therefore an object of the present invention to provide a multi-compartmented vacuum tank or plurality of vacuum tanks for receiving a plurality of operating liquids evacuated from a salvage vehicle while positioned at ground level.

It is another object of the present invention to provide a multi-compartmented vacuum tank or plurality of vacuum tanks for receiving a plurality of operating liquids evacuated from a salvage vehicle while positioned at ground level with a portion of the fumes evacuated from above the evacuated fluids being burned by feeding of a portion of the fumes into the air intake of a fuel system of an engine used to power a vacuum pump which evacuates the operating fluid.

It is still yet another object of the present invention to provide a multi-compartmented vacuum tank or plurality of vacuum tanks for receiving a plurality of liquids evacuated from a salvage vehicle while positioned at ground level with a portion of the fumes evacuated from above the evacuated fluids being burned by feeding of a portion of the fumes into the air intake of a fuel system of an engine used to power a vacuum pump which evacuates the operating fluid and which includes a pressure line used to pressurize the compartments of the multi-compartmented vacuum tank or the plurality of vacuum tanks for forced removal of fluids from the compartments or the tanks.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 3 is an enlarged view of a float valve contained in the compartments of the multi-compartmented vacuum tank and the plurality of vacuum tanks shown in FIGS. 1 and 2, respectively.

DETAILED DESCRIPTION OF THE PREFERRED EMBODIMENTS

Figure 1:
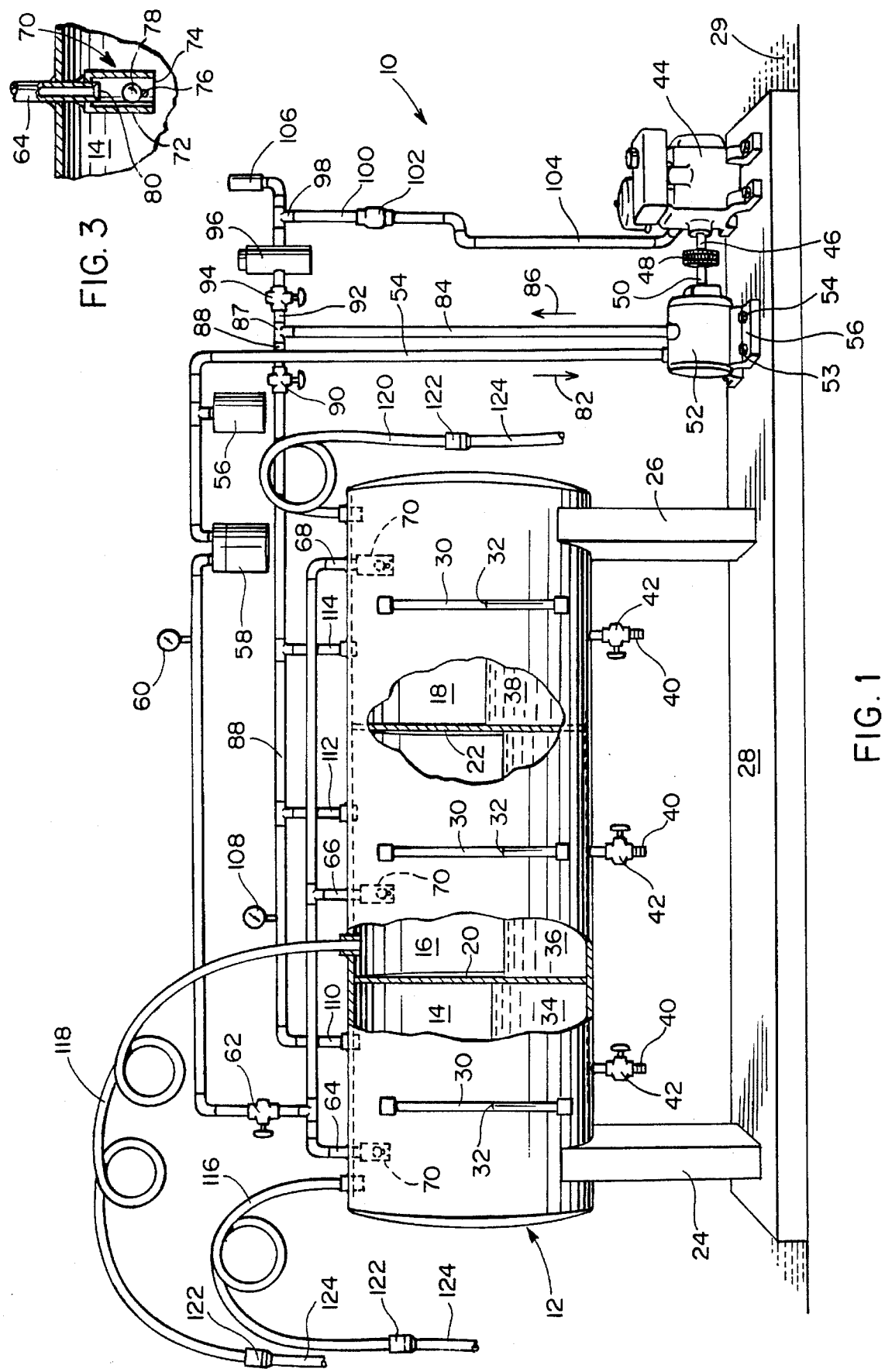
FIG. 1 is a schematic, partially broken away side view of a multi-compartmented vacuum tank which is positionable on a truck, trailer or pickup truck for transport to a salvage vehicle site.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
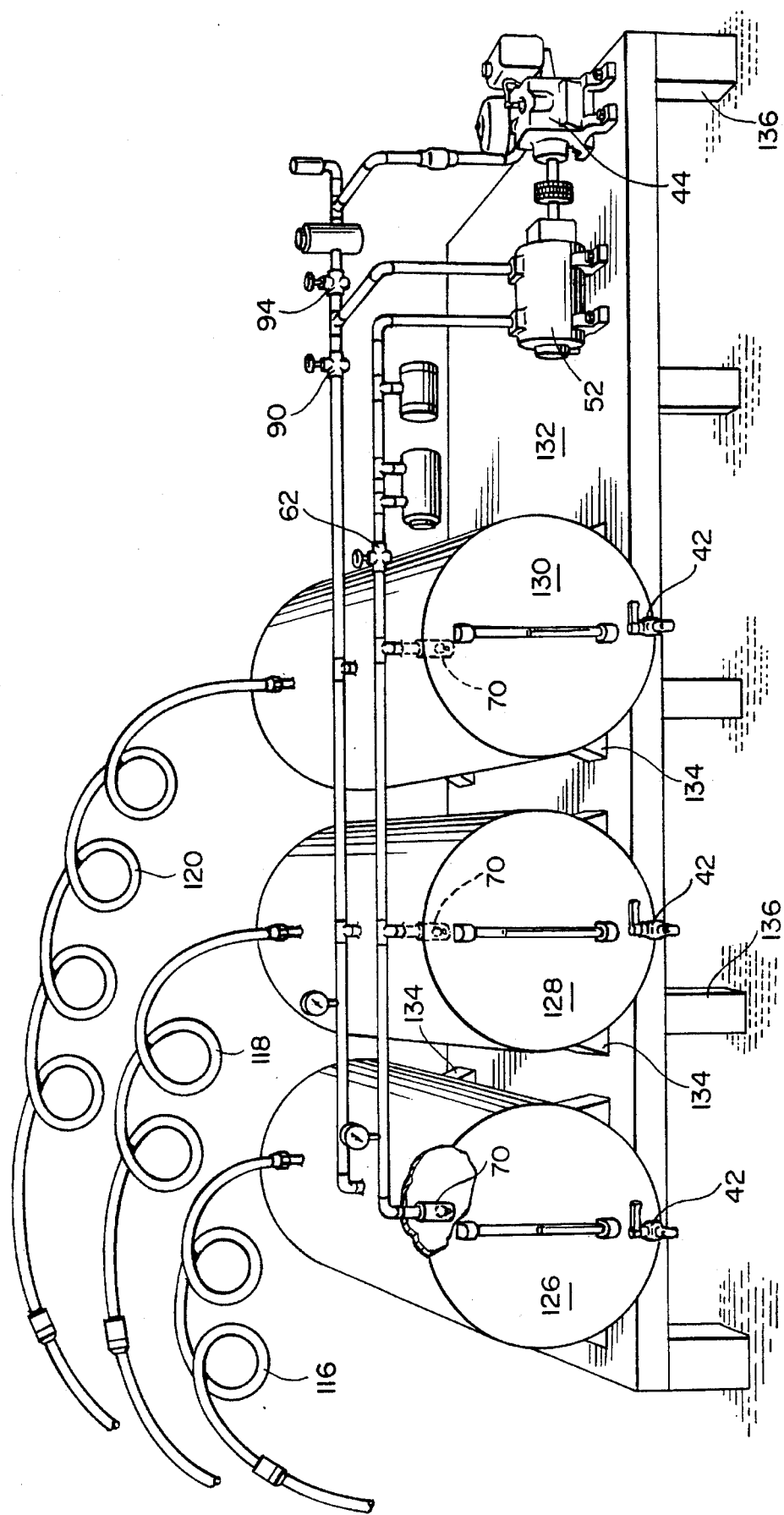
FIG. 2 is a schematic, partially broken away side view of a plurality of vacuum tanks which are positionable on a truck, trailer or pickup truck for transport to a salvage vehicle site.

With reference to the drawings, in general, and to FIG. 1, in particular, a multi-compartmented vacuum tank system embodying the teachings of the subject invention is generally designated as 10. With reference to its orientation in FIG. 1, the multi-compartmented vacuum tank system includes a tank 12 having three compartments 14, 16, and 18 as divided by dividing walls 20 and 22. In the embodiment shown, only three compartments are shown. It is understood that additional compartments may be included within the scope of the invention dependent upon the number of operating fluids to be removed from a salvage vehicle. Alternatively, as shown in FIG. 2, a separate tank can be provided for each operating fluid to be removed from a salvage vehicle. The number of tanks, again, is not limited to three, but to the number of operating fluids to be removed from a salvage vehicle.

In FIG. 1, the pressure tank 12 is supported by two stands 24, 26. The stands project from a base 28. It is understood that the base 28 and the vacuum tank system 10, which the base 28 supports, is transportable to the site of a salvage vehicle by flatbed truck 29. The system 10 may be transported by a truck, a flatbed trailer, or a pickup truck, for example. By this arrangement, it is not necessary to elevate a salvage vehicle or transport it for removal of its operating fluids.

Vacuum tank 12 includes a site tube 30 for each of the compartments 14, 16, and 18. The site tube includes a liquid level line 32, indicative of the height of a respective operating fluids 34, 36, and 38 in each of the compartments 14, 16, and 18.

At the bottom of each compartment is an outlet 40 as controlled by a drain valve 42. Fluid is eventually removed from each of the compartments through the outlet 40.

Located on the base 28 is a power source 44, such as a gasoline-powered engine, for example a 5 HP Briggs and Stratton horizontal crank shaft engine. The engine drive shaft 46 is connected by a coupling 48 to a driven shaft 50 of vacuum pump 52 such as a separate drive rotary vane vacuum pump available from GAST Company, model 1065. Vacuum pump 52 is secured to base 28 by a plurality of bolts 53 extending through a base plate 56.

Extending from an inlet port of the vacuum pump 52 is a vacuum line 54. Interposed along the path of the vacuum line 54 is a 10 micron filter 56 and a trap 58 for removing impurities in the air evacuated from the vacuum tank 12. A pressure gauge 60 registers the pressure in the vacuum line 54.

A control valve 62 is located in the vacuum line prior to the vacuum line 54 entering the vacuum tank 12 for controlling vacuum to the vacuum tank 12. Downstream of the control valve 62, the vacuum line is divided according to the number of compartments in the vacuum tank with a separate vacuum line portion 64, 66, and 68 extending into compartments 14, 16, and 18, respectively. In operation, for the evacuating of air from the vacuum tank 12, the control valve 62 is open.

At the end of the vacuum line portions 64, 66, and 68 within the compartments 14, 16, and 18, respectively, is a ball-type float valve 70. As shown in detail in FIG. 3, the ball-type float valve includes a housing 72 communicating with a vacuum line portion 64, for example. An end 74 of the housing 72 is open into the compartment 14. A pin 76 extends across the housing 72 and supports a float ball 78. The float ball 78 is of a weight such that it will not be sucked upwardly into vacuum line portion 64 but of a density less than the operating fluid contained in the compartment 14.

Accordingly, when the level of fluid rises to the level of the float valve 70, the rising fluid will elevate the float ball 78 such that the ball 78 will be seated in the free end 80 of the vacuum tube portion 64 to block vacuum tube portion 64 and prevent air or fluid from being removed from the compartment 14. This is a safety precaution to prevent flow of operating fluids back to the vacuum pump 52.

When control valve 62 is open and air is being evacuated from vacuum tank 12, air moves from the vacuum tank to the vacuum pump 52 in the direction of arrow 82. The air removed from the vacuum tank includes fumes emanating from the operating fluids 34, 36, 38 contained in the various compartments of the vacuum tank. The air moving into the vacuum pump 52 in the direction of arrow 82 is discharged from an outlet port of the vacuum pump 52 by pressure line 84 with the air moving in the direction of arrow 86. The pressurized air extends along pressure line 84 until reaching T-coupling 87 at which point the pressurized air is divided in two directions.

Air moving along discharge line portion 88 must pass through control valve 90. When control valve 90 is closed, all of the discharge air moves into discharge line portion 92, to control valve 94 which is open, then through muffler 96 until reaching T-joint 98. At T-joint 98, some of the discharge air is removed by bleed line 100 to force open check valve 102 so that a portion of the discharge pressurized air passes by discharge line portion 104 to the air intake of the power source 44. By the directing of a portion of the discharge air to the power source 44, the fumes in the discharge air are burnt in the power source 44 to power the power source 44 and thereby power the vacuum pump 52. The remainder of the discharge air is vented to the atmosphere through a filter 106.

To pressurize the vacuum tank so as to force liquid under pressure through the outlets 40, control valve 62 in the vacuum line 54 is closed. Control valve 62 is a three-way valve communicating with vacuum line 54 and air from the surrounding environment which will allow air into the vacuum line 54 from the surrounding environment when valve 62 is closed while simultaneously blocking passage of air from the tank 12. Control valve 94 is also closed and control valve 90 is opened. With control valve 90 open, pressurized discharge air will move through discharge line portion 88, past pressure gauge 108 and into the tank compartments by discharge line portions 110, 112, and 114. Until control valves 42 are opened, the compartments of the vacuum tank will be pressurized for forced removal of the operating liquids through the outlets 40 when control valves 42 are selectively opened. By the pressurization of the various compartments, the operating fluids may be removed under pressure to a higher elevation, for example, to an operating liquid transport truck for ultimate recycling processing.

In operation, to remove operating liquids from a salvage vehicle, the vacuum tank system 10 is transported to the salvage vehicle. Control valve 90 is closed, control valve 94 is opened and control valve 62 is opened. A suction hose 116, 118, and 120 extends from compartments 14, 16, and 18, respectively. A check valve 122 is interposed in the suction line to allow only fluid and air intake into the suction hoses and prevent escape of air during the pressurization operation. Each suction hose includes a suction nozzle 124 which is used for insertion into a fill port of an operating fluid reservoir so as to remove operating fluids from a salvage vehicle by the vacuum created by vacuum pump 52.

In FIG. 2, identical reference numerals are used to identify identical parts. However, in FIG. 2, instead of a single vacuum tank having separated compartments, a plurality of separate vacuum tanks 126, 128, and 130 are used for three separate operating fluids. It is understood that the number of tanks is dependent upon the number of operating fluids to be removed from a salvage vehicle.

Each vacuum tank 126, 128, and 130 is supported on a base platform 132 by supports 134. The legs 136 of the base platform 132 are positionable on top of a flatbed trailer or truck for transporting the vacuum tank system to the site of a salvage vehicle. The operation of the plurality of vacuum tanks shown in FIG. 2 is identical with that of the single compartmented vacuum tank of FIG. 1 for the evacuation of operating liquids as well as pressurization of the tanks for removal of operating fluids from each of the vacuum tanks shown in FIG. 2.

By the use of the present invention, operating fluids are removed from salvage vehicles at the site of the salvage vehicle without any special maneuvering of the salvage vehicle. Operating fluids are collected without the possibility of spillage onto the ground. A portion of the fumes generated from the stored operating fluids is transmitted to a power source to be burnt as part of the fuel system for the power source which operates the vacuum pump.

Having described the invention, many modifications thereto will become apparent to those skilled in the art to which it pertains without deviation from the spirit of the invention as defined by the scope of the appended claims.

I claim:

1. An evacuation system for removal of an operating fluid from a salvage vehicle, said system comprising:

a vessel for storing an operating fluid of a salvage vehicle, a vacuum pump, means for powering said vacuum pump, a vacuum line from said vacuum pump connected to said vessel, a discharge line from said vacuum pump connected to said vessel, valve means in said vacuum line for allowing evacuation of air from said vessel when said valve means is open, valve means in said discharge line for allowing pressurization of said vessel when said valve means in said discharge line is open and said valve means in said vacuum line is closed, said discharge line including two portions, a first discharge line portion including said valve means in said discharge line and a second discharge line portion open to the atmosphere having a control valve therein, said control valve in said second discharge line portion being closed during pressurization of said vessel, said second discharge line portion being connected with a bleed line, said bleed line being connected to said means for powering said vacuum pump for transmitting air evacuated from said vessel to said means for powering said vacuum pump, and means for removing an operating fluid from a salvage vehicle and delivering the removed operating fluid to said vessel.

2. An evacuation system as claimed in claim 1, wherein said vessel is one of a plurality of compartments of a single vacuum tank.

3. An evacuation system as claimed in claim 1, wherein said vessel is a vacuum tank.

4. An evacuation system as claimed in claim 1, wherein said vacuum line includes a float valve in said vessel for preventing flow of operating fluid into said vacuum line.

5. An evacuation system as claimed in claim 1, wherein said vessel, said vacuum pump, and said means for powering said vacuum pump are supported on a base for movement as a unit to a site of a salvage vehicle.

6. A system for removing an operating fluid from a salvage vehicle, said system comprising:

a vessel for storing an operating fluid from a salvage vehicle, a vacuum pump having an inlet port for drawing in air and an outlet port for discharging air drawn in through said inlet port, power means for powering said vacuum pump, a vacuum line connected to said inlet port and said vessel, a discharge line connected to said outlet port, said vessel, said power means, and being open to the atmosphere, and valve means for opening and closing said vacuum line and said discharge line for controlling evacuation and pressurization of said vessel, and for controlling transfer of evacuated air from said vessel to said power means.

7. An evacuation system as claimed in claim 6, wherein said vessel is one of a plurality of compartments of a single vacuum tank.

8. An evacuation system as claimed in claim 6, wherein said vessel is a vacuum tank.

9. An evacuation system as claimed in claim 6, wherein said vacuum line includes a float valve in said vessel for preventing flow of operating fluid into said vacuum line.

10. An evacuation system as claimed in claim 6, wherein said vessel, said vacuum pump, and said means for powering said vacuum pump are supported on a base for movement as a unit to a site of a salvage vehicle.

11. An evacuation system as claimed in claim 6, wherein said valve means includes three valves.

12. An evacuation system as claimed in claim 11, wherein two of said three valves are in said discharge line and one of said three valves is in said vacuum line.

* * * * *